United States Patent [19]

Hattori et al.

[11] Patent Number: 5,085,522
[45] Date of Patent: Feb. 4, 1992

[54] RETURN GUIDE FIXING STRUCTURE FOR A LINEAR GUIDE APPARATUS

[75] Inventors: Masaru Hattori, Gumma; Toru Tsukada, Maebashi, both of Japan

[73] Assignee: NSK Ltd., Tokyo, Japan

[21] Appl. No.: 740,156

[22] Filed: Aug. 5, 1991

[30] Foreign Application Priority Data

Aug. 7, 1990 [JP] Japan .............. 2-83845[U]

[51] Int. Cl.$^5$ .............................. F16C 29/06
[52] U.S. Cl. ........................................ 384/45
[58] Field of Search ...................... 384/43–45

[56] References Cited

U.S. PATENT DOCUMENTS

| | | | |
|---|---|---|---|
| 4,296,974 | 10/1981 | Teramachi | 384/45 |
| 4,637,739 | 1/1987 | Hattori | 384/45 |
| 4,674,893 | 6/1987 | Teramachi | 384/45 |
| 4,932,067 | 6/1990 | Pester et al. | 384/45 |
| 4,934,834 | 6/1990 | Morita | 384/45 |

FOREIGN PATENT DOCUMENTS 60-103724  7/1985  Japan .

*Primary Examiner*—Thomas R. Hannon
*Attorney, Agent, or Firm*—Basile and Hanlon

[57] ABSTRACT

In a miniature linear guide apparatus, a return guide main body fitting groove which crosses a curved path is formed in a joining end surface of each end cap. A return guide attaching portion fitting groove which extends upwardly from the return guide main body fitting groove is formed in each end cap. A return guide consisting of a return guide main body and a return guide attaching portion formed co-axially with the return guide main body are respectively fitted into the return guide main body fitting groove and the return guide attaching portion fitting groove with a tight fit.

1 Claim, 2 Drawing Sheets

RETURN GUIDE FIXING STRUCTURE FOR A LINEAR GUIDE APPARATUS

BACKGROUND OF THE INVENTION

1. Field of the Invention

The present invention relates to a miniature type linear guide apparatus including a guide rail and a slider linearly movable by being guided by the guide rail through a plurality of steel balls interposed between the guide rail and the slider and, in particular, to a return guide fixing structure for a miniature type linear guide apparatus.

2. Description of the Art

A prior art miniature type linear guide apparatus includes a guide rail having ball rolling grooves formed in both lateral sides and a slider movably straddling the guide rail. The slider consists of a slider main body and end caps respectively joined to opposite ends of the slider main body. The slider main body has ball rolling grooves respectively opposing the ball rolling grooves of the guide rail and ball return passages respectively in parallel with the ball rolling grooves of the slider main body. On the other hand, each end cap has a pair of semicircular curved paths for bringing the ball rolling grooves into communication with the ball return passages. Thus, the slider is formed with a pair of ball infinitely circulating routes, each including the ball rolling grooves, the ball return passage in parallel with the ball rolling grooves, and the curved paths connecting the ball rolling grooves and the ball return passage. The slider is movable relative to the guide rail in an axial direction through the rolling of the plurality of balls.

In the case of a standard size linear guide apparatus, each of curved paths formed in an end cap has a half-doughnut shape so that balls make a smooth U-turn. Specifically, a pair of semicircular grooves are formed in a joining surface of the end cap and return guide fitting grooves having a half-cylindrical shape are formed respectively across the semicircular grooves. A half-cylindrical return guide is fitted into each of the return guide fitting grooves to form the curved path having the half-doughnut shape. The half-cylindrical return guide has projections formed on opposite ends. The return guide is fixed in the return guide fitting groove by using the projections as interferences.

In the case of the miniature type linear guide apparatus, as compared with the standard size linear guide apparatus, since it is very small in size, a sufficient space for the return guide is not available. As a result, the curved path formed in the end cap remains in its semicircular shape without being formed in the half-doughnut shape. Thus, no return guide is attached. For this reason, in some cases, the U-turn of the balls is not smooth. Accordingly, the inventors of the present application previously tried to make the U-turn of the balls smooth and, as shown in FIG. 6, a return guide fitting groove 11 is formed in an end cap 9 of a miniature type linear guide apparatus. A half-cylindrical return guide G having projections g1 as in the case of the standard size linear guide apparatus is attached to the return guide fitting groove 11.

However, since the space or area is not sufficient, at a lower end side of the return guide fitting groove 11 having a half-cylindrical shape, the wall thickness t of the end cap 8 becomes thin. As a result, when the return guide G is fitted into the return guide fitting groove 11, the thin wall portion of the end cap 8 is deformed and the fixing of the return guide G is not satisfactory. Accordingly, when the end cap 8 is attached to the slider main body, the return guide G falls off the end cap 8 and a problem is encountered in that the assembling work is inconvenient.

Furthermore, another problem is involved in that since the return guide G cannot be completely secured, the return guide G is loose and the smooth rolling movement of the balls is not insured, and the smooth operation of the linear guide apparatus cannot be achieved.

SUMMARY OF THE INVENTION

The present invention was made in view of the problems mentioned above and it is an object of the present invention to provide a return guide fixing structure for a miniature type linear guide apparatus which solves the above-described problems.

A return guide fixing structure of the present invention is used in a linear guide apparatus which includes a guide rail having axial ball rolling grooves formed in both lateral sides and extending in an axial direction, a slider main body movably fitted on the guide rail and having ball rolling grooves respectively opposing the ball rolling grooves of the guide rail and having through bores as ball return passages disposed in parallel with the ball rolling grooves of the slider main body, end caps respectively joined to opposite ends of the slider main body, each of the end caps including a pair of curved path bringing the ball rolling grooves into communication with the ball return passages, and a plurality of balls rollably inserted in the ball rolling grooves. The return guide fixing structure includes a pair of return guides each having a return guide main body and a return guide attaching portion formed concentrically with the return guide main body, a pair of return guide main body fitting grooves formed in a joining surface of each of the end caps so that the return guide main body fitting grooves respectively cross the curved paths in the end caps, and a pair of return guide attaching portion fitting grooves respectively extending upwardly from the return guide main body fitting grooves so that the return guide main body and the return guide attaching portion are respectively fitted into the return guide main body fittinq groove and the return guide attaching portion fitting groove.

As described above, in the present invention, the return guide attaching portion fitting groove is formed by extending upwardly the return guide main body fitting groove having a half-cylindrical shape over a vacant area of the end cap. The return guide is fixed with a tight fit by utilizing the guide attaching portion fitting groove. As a result, the fall off of the return guide is prevented and the fixing work is also facilitated.

Furthermore, there is no play associated with the return guide and smooth operation of the balls can be achieved.

DESCRIPTION OF THE PREFERRED EMBODIMENTS

Figure 1:
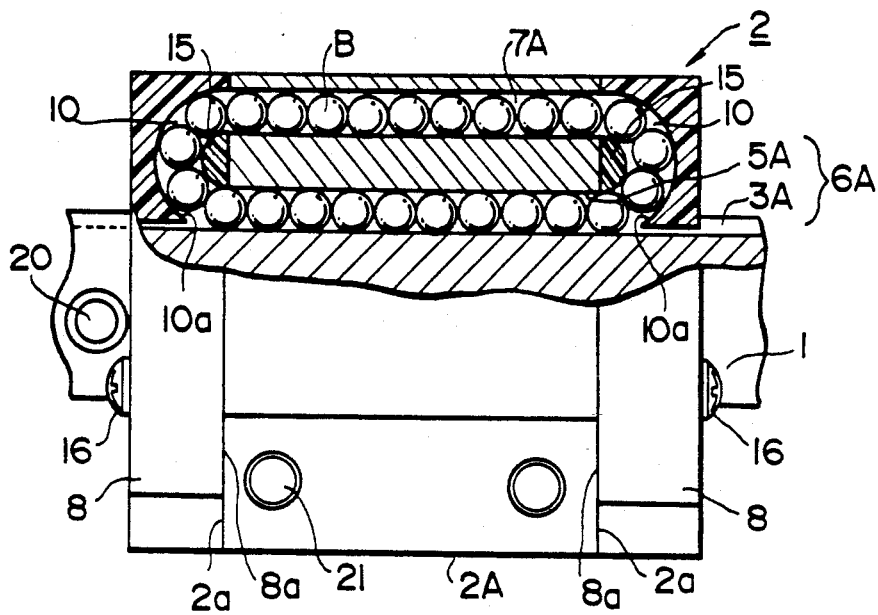
FIG. 1 is a plan view of a main part, partially in cross section, of a miniature type linear guide apparatus showing a first embodiment of the present invention.
Figure 2:
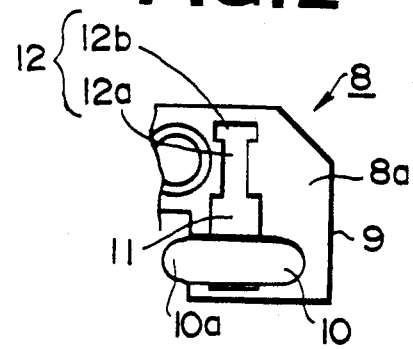
FIG. 2 is a view of a rear surface (joining surface) of a main part of the end cap shown in FIG. 1.

FIGS. 1 to 4 show a first embodiment of the present invention. With reference to FIG. 1, on a guide rail 1, a slider 2 having a substantially inverted U-shaped cross section is loosely fitted so that the slider 2 is movable relative to the guide rail 1 in an axial direction. The guide rail 1 has a pair of ball rolling grooves 3A formed in both lateral sides, which rolling grooves 3A extend lengthwise in the axial direction and have a substantially semicircular cross section.

On the other hand, a slider main body 2A has a pair of ball rolling grooves 5A formed in the inner surfaces of both side walls thereof so that the ball rolling grooves 5A respectively oppose the ball rolling grooves 3A of the guide rail 1. A ball rolling passage 6A is formed by the opposing ball rolling grooves 3A and 5A.

The slider main body 2A further has ball return passages 7A axially penetrating both the side walls in parallel with the ball rolling passage 6A. The ball return passages 7A have a circular cross section.

End caps 8 which are injection mold products of a synthetic resin are respectively joined to opposite ends of the slider main body 2A. Each end cap 8 has a substantially inverted U-shaped cross section. An end surface 8a of each end cap 8 which is joined to an end surface 2a of the slider main body 2A is formed with semicircular curved paths 10 in both side wall portions 9. Each of the curved paths 10 brings the ball rolling passage 6A into communication with the ball return passage 7A.

A return guide main body fitting groove 11 having a half-cylindrical shape is formed in the end surface of each of the side wall portions 9 of the end cap 8. The return guide main body fitting groove 11 crosses a center portion of the curved path 10 in a vertical direction. A return guide attaching portion fitting groove 12 extends upwardly from the return guide main body fitting groove 11. A return guide 15 is fitted into both of the fitting grooves 11 and 12 and, thus, the curved path 10 is formed in a half-doughnut shape as shown in FIG. 1.

In more detail, the return guide attaching portion fitting groove 12 consists of a connecting portion fitting groove 12a having a relatively narrow groove width and a holding portion fitting groove 12b formed in an upper end of the connecting portion fitting groove 12a. On the other hand, the return guide 15 consists of a return guide main body 15a having a half-cylindrical shape, a connecting portion 15b extending co-axially from the return guide main body 15a and having a narrow width, and a holding portion 15c extending further from an upper end of the connecting portion 15b. The connecting portion 15b and the holding portion 15c constitute a return guide attaching portion 15d. The connecting portion 15b is fitted into the connecting portion fitting groove 12a and the holding portion 15c is fitted into the holding portion fitting groove 12b with a tight fit.

An inner end of the curved path 10 of the end cap 8 protrudes inwardly as shown in FIG. 1 to form a ball scooping projection 10a and its tip end forming an acute angle is loosely fitted into the ball rolling groove 3A of the guide rail 1.

Figure 4:
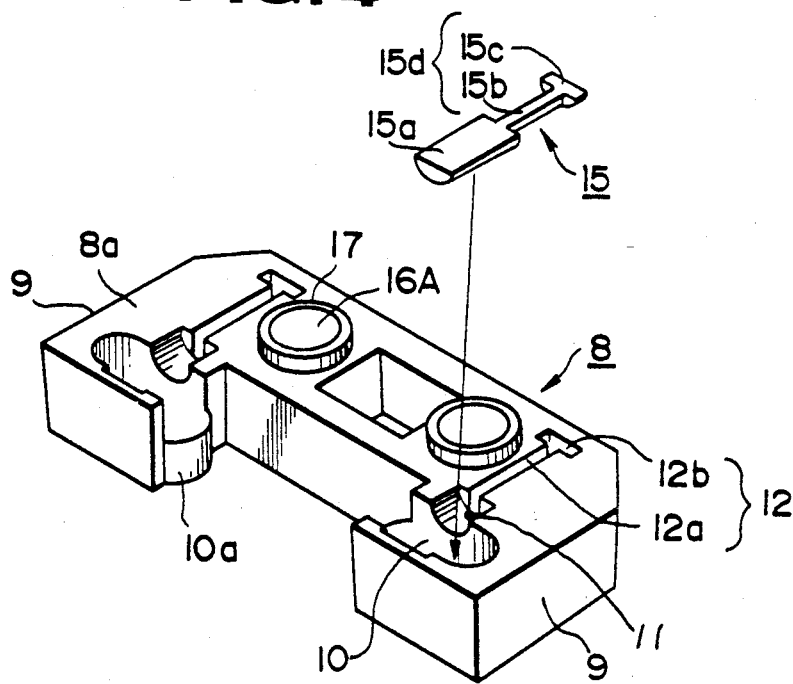
FIG. 4 is a perspective view illustrating the attachment of the return guide to the end cap.
Figure 3:
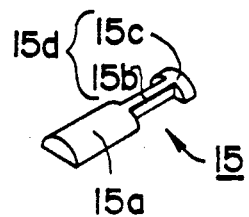
FIG. 3 is a perspective view of the return guide shown in FIG. 1.

Furthermore, as shown in FIG. 4, a guide convex portion 17 is formed on a joining end side of a through bore 16A for a fixing screw 16 formed in the end cap 8. This guide convex portion 17 insures a joining accuracy with the slider main body 2A and brings the curved path 10 into communication with the ball rolling groove 5A and the ball return passage 7A of the slider main body 2A without producing a step portion therebetween.

A plurality of balls B are loaded in an infinitely circulating route formed by the ball rolling passage 6A, the curved paths 10 and the ball return passage 7A as shown in FIG. 1.

Furthermore, in FIG. 1, the reference numeral 20 denotes a through bore for a bolt for fixing the guide rail 1 to a base or the like (not shown) when the linear guide apparatus is to be used. Reference numeral 21 denotes a screw bore of a bolt for fixing a driven member, such as a table, to the slider 2.

Next, the operation of the invention will be described.

As shown in FIG. 4, the return guide main body 15a of the return guide 15 is inserted into and fixed to the return guide main body fitting groove 11 of the end cap 8. In this case, the connecting portion 15b is pushed into the connecting portion fitting groove 12a and the holding portion 15c is pushed into the holding portion fitting groove 12b so as to attain fixing with a tight fit. As a result, since the return guide 15 is completely fixed, it will never fall off of the end cap 8. Thus, the assembling work is performed efficiently.

Thereafter, the joining end surface 8a of the end cap 8 is made to confront the joining end surface 2a of the slider main body 2A and a small fixing screw 16 is inserted through the screw through bore 16A and tightened. Thus, the end cap 8 is secured to the slider main body 2A.

When the slider 2 on the guide rail 1 is moved in an axial direction, the balls B inserted in the ball rolling groove 6A roll and move with the movement of the slider 2, with the balls B moving in a direction opposite to the direction of movement of the slider 2. At a rear end of the slider 2, the balls B are guided by the ball scooping projection 10a formed in the end cap 8. In this manner, the direction of the balls B is changed and the balls B make a U-turn along the curved path 10. Subsequently, the balls B pass through the ball return passage 7A of the slider main body 2A and again make a U-turn by the curved path 10 of the end cap 8 at the opposite side to return to the ball return passage 6A. In this manner, the balls B repeat the circulating movement while rolling.

At the time of the U-turn of the balls B, since the return guide 15 has no play in its fixed condition, the U-turn of the balls B which are guided by the return guide 15 is carried out smoothly. Accordingly, a satisfactory operation of the linear guide apparatus can be achieved.

Figure 5:
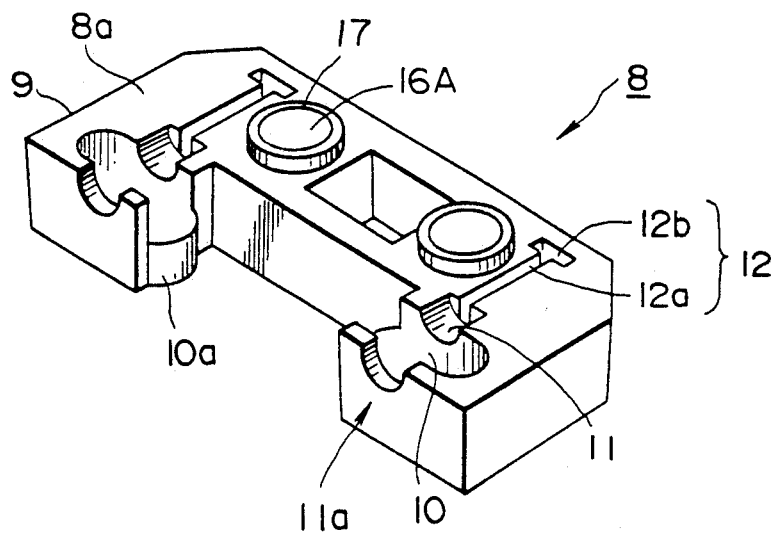
FIG. 5 is a perspective view illustrating a second embodiment of the present invention.

FIG. 5 shows a second embodiment of the present invention.

Figure 6:
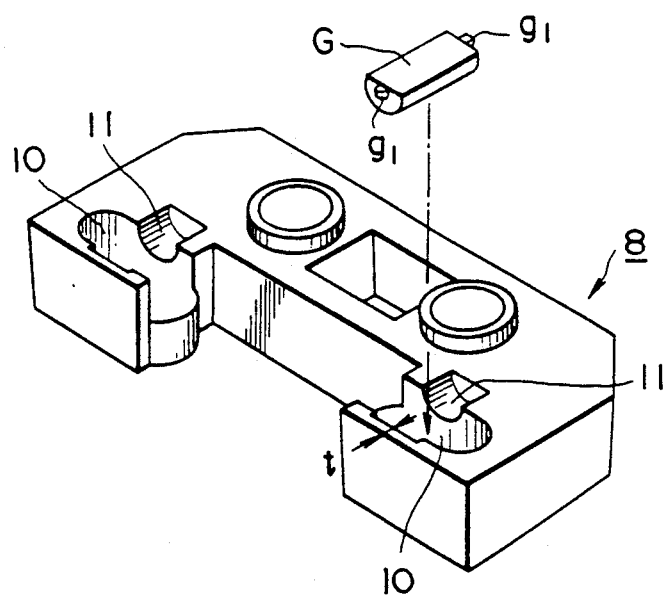
FIG. 6 is a perspective view showing a fixing structure of a return guide in a prior art miniature type linear guide apparatus.

In this embodiment, a bottom wall portion having a thin thickness t, FIG. 6, of the return guide main body fitting groove 11 of the end cap 8 is removed so that a lower end of the return guide main body fitting groove 11 opens to a lower surface of the side wall portion 9 of the end cap 8 to thereby form an opening portion 11a. This feature differs from the first embodiment. Even when the bottom wall portion has a weak strength, since the return guide 15 is fixed with the holding portion 15c by being engaged and held in the holding portion fitting groove 12b, rattle or looseness is not caused.

In this embodiment, the molding of the end cap 8 can be easily made. Furthermore, since it is easy to check whether the return guide has been properly assembled without being forgotten by an outer appearance test of an assembled linear guide apparatus, it is advantageous in that quality insurance can be reliably achieved.

As described in the foregoing, in the present invention, a return guide main body fitting groove crosses the curved path formed in the end cap and, further, a return guide attaching portion fitting groove which is continuous to an upper portion of the return guide main body fitting groove is formed so that the return guide is fixed by fitting the return guide into these fitting grooves. As a result, the fall off of the return guide is prevented and the assembling work can be achieved satisfactorily. Furthermore, since the return guide is fixed without causing play or looseness, the smooth rolling of the balls can be insured.

What is claimed is:

1. In a linear guide apparatus having a guide rail with axial ball rolling grooves formed in both lateral sides and extending in an axial direction, a slider main body movably and loosely fitted on the guide rail and having ball rolling grooves respectively opposing the ball rolling grooves of the guide rail and having through bores acting as a ball return passages formed in parallel with the ball rolling grooves of the slider main body, end caps respectively joined to opposite ends of the slider main body, each of the end caps including a pair of curved paths for bringing the ball rolling grooves into communication with the ball return passages, and a plurality of balls rollably inserted in the ball rolling grooves, a return guide fixing structure comprising:

a pair of return guides formed in each of the end caps, each of the return guides having a return guide main body and a return guide attaching portion formed concentrically with the return guide main body;

a pair of return guide main body fitting grooves formed in a joining surface of each of the end caps so that the return guide main body fitting grooves respectively cross the curved paths in the end caps; and a pair of return guide attaching portion fitting grooves respectively extending upwardly from the return guide main body fitting grooves so that the return guide main body and the return guide attaching portion are respectively fitted into the return guide main body fitting groove and the return guide attaching portion fitting groove.

* * * * *